(12) United States Patent
Uchikawa et al.

(10) Patent No.: US 8,597,612 B2
(45) Date of Patent: Dec. 3, 2013

(54) METHOD FOR PRODUCING DDR ZEOLITE

(75) Inventors: Tetsuya Uchikawa, Nagoya (JP); Makiko Niino, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/445,192

(22) Filed: Apr. 12, 2012

(65) Prior Publication Data

US 2012/0196739 A1    Aug. 2, 2012

Related U.S. Application Data

(63) Continuation of application No. PCT/JP2010/066778, filed on Sep. 28, 2010.

(30) Foreign Application Priority Data

Oct. 16, 2009 (JP) ................................ 2009-239752

(51) Int. Cl.
  *C01B 39/06* (2006.01)
  *C01B 39/48* (2006.01)
  *B01D 53/14* (2006.01)

(52) U.S. Cl.
  CPC ............ *C01B 39/06* (2013.01); *C01B 39/48* (2013.01); *B01D 53/14* (2013.01); *B01D 2253/108* (2013.01)
  USPC ............................................ 423/706; 502/69

(58) Field of Classification Search
  USPC ........................................... 423/706; 502/69
  See application file for complete search history.

(56) References Cited

U.S. PATENT DOCUMENTS

2009/0011926 A1    1/2009 Yajima et al.
2012/0196739 A1*   8/2012 Uchikawa et al. ............... 502/5

FOREIGN PATENT DOCUMENTS

| JP | 2004-083375 A1 | 3/2004 |
| JP | 2005-067991 A1 | 3/2005 |
| JP | 2008-018387 A1 | 1/2008 |
| WO | 2007/105407 A1 | 9/2007 |

OTHER PUBLICATIONS

Factors that Affect the Rate of Dissolving and Solubility, pp. 290-301, (May 2001), QuarkExpress.*
International Search Report and Written Opinion dated Dec. 28, 2010.

* cited by examiner

*Primary Examiner* — David M Brunsman
(74) *Attorney, Agent, or Firm* — Burr & Brown

(57) ABSTRACT

Disclosed is a method for producing a DDR zeolite, which can be carried out using materials that are less harmful to the environment. The method for producing a DDR zeolite has a short hydrothermal synthesis time and does not require continuous agitation of the raw material solution. Specifically disclosed is a method for producing a DDR zeolite, which comprises: a raw material solution preparation step in which a raw material solution that contains 1-adamantaneamine, silica ($SiO_2$) and water at a molar ratio 1-adamantaneamine/$SiO_2$ of 0.002-0.5 and a molar ratio water/$SiO_2$ of 10-500 but does not contain ethylenediamine is prepared; and a crystal growth step in which hydrothermal synthesis is carried out while having the raw material solution and a DDR zeolite powder in contact with each other, so that crystals of DDR zeolite are grown using the DDR zeolite powder as a seed crystal.

5 Claims, 1 Drawing Sheet

METHOD FOR PRODUCING DDR ZEOLITE

This application is a Bypass Continuation Application of of PCT/JP2010/066778, filed Sep. 28, 2010.

BACKGROUND OF THE INVENTION

1. Field of the Invention

The present invention relates to a method for producing a DDR zeolite which can be used for a catalyst, a catalyst carrier, an adsorbent, a gas separation membrane, a pervaporation membrane, and the like.

2. Description of Related Art

Zeolite includes many kinds which are called LTA, MFI, MOR, AFI, FER, FAU, and DDR into which the zeolite is classified according to a crystal structure thereof.

Of them, DDR (Deca-Dodecasil 3R) comprises a silica as a main component and has a pore which is formed by a polyhedron including an oxygen-containing eight-membered ring in a crystal structure thereof. Pore size of the DDR zeolite is 4.4×3.6 angstrom which is relatively small in pore size of a zeolite.

The DDR zeolite has a difference in adsorption properties to low molecular weight gases in addition to the small pore size. Thus, the DDR zeolite is applied to an adsorbent which separates only low molecular weight gases. For example, when forming in the membrane form, the DDR zeolite can be used as a molecular sieve membrane to low molecular weight gases.

A known method for producing a DDR zeolite includes a method in which crystals of a DDR zeolite are grown by using 1-adamantaneamine as a structure-defining agent, using a colloidal silica, ethylenediamine and water as raw materials, and adding a seed crystal of a DDR zeolite to these raw materials to carry out a hydrothermal synthesis. The production method obtains an all-silica type DDR zeolite containing no aluminium (Patent Documents 1 and 2).

PRIOR ART DOCUMENTS

Patent Documents

Patent Document 1: JP-A-2004-83375
Patent Document 2: JP-A-2005-67991

However, the conventional method for producing a DDR zeolite takes a long period of time for a hydrothermal synthesis and requires a continuous agitation of a raw material solution during the hydrothermal synthesis in order to obtain a single crystal of the DDR zeolite.

In the methods for producing a DDR zeolite disclosed in Patent Documents 1 and 2, the conditions of a hydrothermal synthesis are improved by dissolving 1-adamantaneamine in ethylenediamine. However, ethylenediamine is a target substance for a PRTR system, and thus a method for producing a DDR zeolite by using no ethylenediamine is desired for becoming less harmful to the environment.

In consideration of the above problems, the problem of the present invention is to provide a method for producing a DDR zeolite which can be carried out using materials that are less harmful to the environment and which has a short hydrothermal synthesis time and does not require a continuous agitation of the raw material solution.

SUMMARY OF THE INVENTION

In order to solve the above problem, the present inventors found suitable conditions for dissolving 1-adamantaneamine in a raw material solution and completed the present invention. That is, according to the present invention, a method for producing a DDR zeolite as shown below is provided.

[1] A method for producing a DDR zeolite which comprises:

a raw material solution preparation step in which a raw material solution, that contains 1-adamantaneamine and a silica ($SiO_2$) and water at a molar ratio 1-adamantaneamine/$SiO_2$ of from 0.002 to 0.5 and a molar ratio water/$SiO_2$ of from 10 to 500 but does not contain ethylenediamine, is prepared; and a crystal growth step in which a hydrothermal synthesis is carried out while having the raw material solution and a DDR zeolite powder in contact with each other, so that crystals of DDR zeolite are grown using the DDR zeolite powder as a seed crystal.

[2] The method for producing a DDR zeolite according to the above [1], wherein the raw material solution preparation step comprises the step of making a temperature of the raw material solution from 40 to 100° C.

[3] The method for producing a DDR zeolite according to the above [1] or [2], wherein the raw material solution preparation step comprises a dissolution acceleration step in which a dissolution of said 1-adamantaneamine is accelerated.

[4] The method for producing a DDR zeolite according to the above [3], wherein the dissolution acceleration step comprises the step of irradiating an ultrasonic wave to the raw material solution.

[5] The method for producing a DDR zeolite according to any one of the above [1] to [4], wherein the crystal growth step comprises the step of bringing the raw material solution and the DDR zeolite powder in contact with each other by dispersing the DDR zeolite powder into the raw material solution.

[6] The method for producing a DDR zeolite according to any one of the above [1] to [4], wherein the crystal growth step comprises the step of bringing the raw material solution and the DDR zeolite powder in contact with each other by immersing, into the raw material solution, a support having the DDR zeolite powder adhered.

[7] The method for producing a DDR zeolite according to any one of the above [1] to [5], wherein the crystal growth step comprises the step of forming the DDR zeolite on a support by immersing the support into the raw material solution into which the DDR zeolite powder is dispersed.

The method for producing a DDR zeolite of the present invention has a short hydrothermal synthesis time and does not require a continuous agitation of the raw material solution. Additionally, the method for producing a DDR zeolite of the present invention can be carried out without using ethylenediamine that is pointed out as being harmful to the environment.

DETAILED DESCRIPTION OF THE INVENTION

Figure 1:
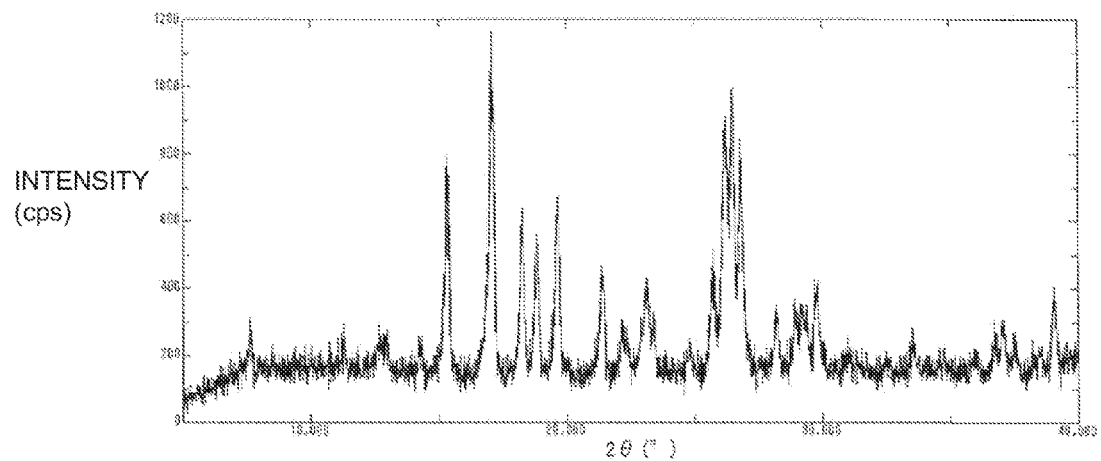
FIG. 1 is a diagram showing an X-ray diffraction pattern of a powdery DDR zeolite of Example 1.

Embodiments of the present invention are explained below with referring to Figures. The present invention is not limited to the following embodiments and can be changed, modified and improved without departing from the scope of the present invention.

1. Summary of the Method for Producing a DDR Zeolite of the Present Invention:

The method for producing a DDR zeolite of the present invention comprises: a raw material solution preparation step in which a raw material solution, that contains 1-adamantaneamine and a silica ($SiO_2$) and water but does not contain ethylenediamine, is prepared; and a crystal growth step in which a hydrothermal synthesis is carried out while having the raw material solution and a DDR zeolite powder in contact with each other, so that crystals of DDR zeolite are grown using the DDR zeolite powder as a seed crystal.

In the method for producing a DDR zeolite of the present invention, by making a temperature of the raw material solution from 40 to 100° C. in the raw material solution preparation step, 1-adamantaneamine can be dissolved in the raw material solution without containing ethylenediamine in the raw material solution.

The method for producing a DDR zeolite of the present invention does not use ethylenediamine which is a target substance for a PRTR system, and thus the method of the present invention is less harmful to the environment.

In the method for producing a DDR zeolite of the present invention, 1-adamantaneamine, which is in a state of being capable of functioning as a structure-defining agent, can be dissolved in a sufficient amount in the raw material solution. Therefore, in the method for producing a DDR zeolite of the present invention, a crystal growth of a DDR zeolite efficiently proceeds with and the resulting zeolite crystal does not become a mixed phase with a type other than a DDR type.

Each step in the method for producing a DDR zeolite of the present invention is described in detail as follows.

1-1. Raw Material Solution Preparation Step:

In the raw material solution preparation step, a raw material solution containing 1-adamantaneamine and a silica ($SiO_2$) and water is prepared. The silica ($SiO_2$) in the raw material solution becomes a supply source for a silicon (Si) atom and an oxygen (O) atom constituting a DDR zeolite at the time of a crystal growth in the crystal growth step. 1-adamantaneamine is a material, which becomes a template for forming a crystal structure of the DDR zeolite at the time of the crystal growth of the DDR zeolite, so-called a structure-defining agent.

The raw material solution contains 1-adamantaneamine and a silica ($SiO_2$) at a molar ratio 1-adamantaneamine/$SiO_2$ of from 0.002 to 0.5. When the molar ratio 1-adamantaneamine/$SiO_2$ is 0.002 or more, the raw material solution does not run short of 1-adamantaneamine dissolved therein and a crystal growth speed of the DDR zeolite does not come to be decreased. In contrast, if the molar ratio 1-adamantaneamine/$SiO_2$ is up to 0.5, an amount of 1-adamantaneamine is sufficient. Thus, when the molar ratio 1-adamantaneamine/$SiO_2$ is 0.5 or less, it can be avoided to use 1-adamantaneamine in an amount more than necessary, and thus the molar ratio is preferable from the viewpoint of the cost of production.

The raw material solution contains water and a silica ($SiO_2$) at a molar ratio water/$SiO_2$ of from 10 to 500. The molar ratio water/$SiO_2$ within the value range is suitable for a crystal growth of the DDR zeolite.

It is preferred that the raw material solution is prepared by using a silica sol.

The silica sol used can be prepared by dissolving fine silica powders in water or can be a commercially available colloidal silica or can be prepared by a hydrolysis of an alkoxide such as TEOS.

In the meanwhile, in the raw material solution preparation step, the DDR zeolite powder becoming a seed crystal can be beforehand dispersed into the raw material solution.

In the raw material solution preparation step, 1-adamantaneamine easily becomes dissolved in the raw material solution by making a temperature of the raw material solution from 40 to 100° C. As a result, 1-adamantaneamine is dissolved in an amount sufficient for the crystal growth of the DDR zeolite.

At the time of making a temperature of the raw material solution from 40 to 100° C., it is preferred that the raw material solution is heated with a hot bath and the like and the raised temperature is maintained as it is after attaining the intended temperature.

The above heating of the raw material solution can be carried out while having or not having the raw material solution and the DDR zeolite powder becoming a seed crystal in contact with each other.

In case of making a temperature of the raw material solution from 40 to 100° C. while having the raw material solution and the DDR zeolite powder in contact with each other in the raw material solution preparation step, it is preferred that it is set up to a temperature, at which the crystal growth of the DDR zeolite does not proceed with, among a temperature of from 40 to 100° C.

1-2. Crystal Growth Step:

In the crystal growth step, a hydrothermal synthesis is carried out while having the raw material solution and the DDR zeolite powder in contact with each other, so that crystals of DDR zeolite are grown using the DDR zeolite powder as a seed crystal.

In the hydrothermal synthesis of the crystal growth step, a temperature of the raw material solution is usually from 120 to 170° C., more preferably from 150 to 170° C. from the viewpoint of accelerating a crystal growth speed.

A period of time of the hydrothermal synthesis of the crystal growth step is usually from 12 to 84 hours, preferably from 12 to 24 hours from the viewpoint of lowering the cost of production.

The method for producing a DDR zeolite of the present invention having the above-described features can apply the embodiment as described below.

2. Embodiment in which a Dissolution of 1-adamantaneamine Is Accelerated by a Dissolution Acceleration Step:

In the raw material solution preparation, it is preferred that a dissolution acceleration step, in which a dissolution of the 1-adamantaneamine in the raw material solution is accelerated, is carried out. Additionally, it is more preferred that the dissolution acceleration step is carried out after the raw material solution attains a temperature of from 40 to 100° C. By the dissolution acceleration step, 1-adamantaneamine is further certainly dissolved in the raw material solution, and additionally 1-adamantaneamine is kept at a state in which 1-adamantaneamine can function as a structure-defining agent at the crystal growth in the raw material solution.

Specific examples of the dissolution acceleration step include the step of irradiating an ultrasonic wave to the raw material solution, and an agitation of the raw material solution with a homogenizer or a shaker, and the like.

In case that an ultrasonic wave is irradiated to the raw material solution as the dissolution acceleration step, it is preferred that an ultrasonic wave is irradiated to the raw material solution at a state in which the raw material solution is kept at a temperature of from 40 to 100° C. Additionally, by irradiating the ultrasonic wave together with an agitation or a temperature control of the raw material solution, a solubility of 1-adamantaneamine in the raw material solution is further enhanced.

3. Embodiment in Which the DDR Zeolite Powder is Dispersed into the Raw Material Solution:

The crystal growth step can be carried out by dispersing, into the raw material solution, the DDR zeolite powder becoming a seed crystal. In this embodiment, as a result of the crystal growth, the DDR zeolite can be obtained in the form of powder.

Additionally, the DDR zeolite can be also formed on a support by immersing the support into the raw material solution into which the DDR zeolite powder is dispersed.

4. Embodiment Using a Support Having the DDR Zeolite Powder Adhered:

The crystal growth step can be carried out at a state of immersing, into the raw material solution, a support having the DDR zeolite powder adhered. In this embodiment, as a result of the crystal growth, the DDR zeolite can be formed on the support.

EXAMPLES

The present invention is described in more detail below based on examples. However, the present invention is not limited to those examples.

Example 1

In Example 1, an all-silica type powdery DDR zeolite was prepared. Details are described below.
(Raw Material Solution Preparation Step)

First, 47.1 g of water and 32.3 g of a silica sol (Trade name: Snowtex S commercially available from Nissan Chemical Industries, Ltd; solids concentration: 30 mass %) were slightly agitated and mixed in a 100 ml jar made of a fluororesin. To the mixed liquid, 0.65 g of 1-adamantaneamine (commercially available from Sigma-Aldrich Corporation) was added to obtain a raw material solution. The raw material solution was prepared so that a molar ratio 1-adamantaneamine/$SiO_2$ becomes 0.0268 and a molar ratio water/$SiO_2$ becomes 24.0.

Subsequently, the raw material solution was put in a hot bath of about 80° C. hot water to heat it up. Next, 1-adamantaneamine was further certainly dissolved by carrying out an agitation together with irradiating an ultrasonic wave to the raw material solution.
(Crystal Growth Step)

Subsequently, the raw material solution was charged into a jar, 0.8 g a DDR zeolite seed crystal-dispersed solution having a particle size of 5 μm or less and a solids concentration of 0.34% by weight was added thereto, and a DDR zeolite powder becoming a seed crystal was dispersed by slightly agitated. Then, the raw material solution was transferred to a stainless steel pressure-resistant container equipped with an internal cylinder made of a fluororesin having an internal volume of 100 ml, and a hydrothermal synthesis was carried out at 160° C. for 16 hours without agitation. After heat treatment, a white synthetic powder was deposited on a bottom face of the internal cylinder made of a fluororesin. The white synthetic powder was taken out from the bottom face of the internal cylinder made of a fluororesin, was washed with water, and was dried at 80° C. Thus, a powdery DDR zeolite formed by a crystal growth was obtained. Hereinafter, the powdery DDR zeolite obtained in Example 1 is referred to as a powdery DDR zeolite of Example 1.

Example 2

In Example 2, an all-silica type DDR zeolite was formed on an alumina porous support. Details are described below.
(Raw Material Solution Preparation Step)

First, 107.11 g of water and 90.32 g of a silica sol (Trade name: Snowtex S commercially available from Nissan Chemical Industries, Ltd; solids concentration: 30 mass %) were slightly agitated and mixed in a 1000 ml jar made of a fluororesin. To the mixed liquid, 1.06 g of 1-adamantaneamine (commercially available from Sigma-Aldrich Corporation) was added to obtain a raw material solution. The raw material solution was prepared so that a molar ratio 1-adamantaneamine/$SiO_2$ becomes 0.0156 and a molar ratio water/$SiO_2$ becomes 21.0.

Subsequently, the raw material solution was put in a hot bath of about 80° C. hot water to heat it up. Next, 1-adamantaneamine was further certainly dissolved by carrying out an agitation together with irradiating an ultrasonic wave to the raw material solution.
(Crystal Growth Step)

Subsequently, the raw material solution was transferred to a stainless steel pressure-resistant container equipped with an internal cylinder made of a fluororesin having an internal volume of 250 ml. An alumina porous support having a DDR zeolite powder beforehand adhered was immersed into the raw material solution, and a hydrothermal synthesis was carried out at 150° C. for 50 hours without agitation. After the hydrothermal synthesis, the alumina support was taken out from the internal cylinder made of a fluororesin. The alumina support taken out was washed with water, and was dried at 80° C. Hereinafter, the alumina support obtained in Example 2 is referred to as an alumina support after a hydrothermal synthesis of Example 2.
(Observation of Microstructure)

An observation of a microstructure of the alumina support after a hydrothermal synthesis of Example 2 was carried out by a scanning electron microscope (hereinafter referred to as SEM). As a result, it was confirmed that many crystal grains were adhered onto the alumina support after a hydrothermal synthesis of Example 2.
(Evaluation of Crystal Phase)

An evaluation of a crystal phase of the powdery DDR zeolite of Example 1 was carried out by an X-ray diffraction. As a result, only diffraction peaks of a DDR zeolite were clearly detected, a halo was not recognized over a region of 2θ=20 to 30° (CuKα). Thus, in Example 1, it was confirmed that a perfect crystal of a DDR zeolite was obtained. A diagram shown at FIG. 1 represents an X-ray analytical result measured by analyzing the powdery DDR zeolite of Example 1 with an X-ray diffractometer (device name: MiniFlex commercially available from Rigaku Corporation). In the meanwhile, "diffraction peaks of a DDR zeolite" in an X-ray diffraction represent diffraction peaks described at No. 38-651 or 41-571 corresponding to Deca-dodecasil 3R shown at International Center for Diffraction Data (ICDD), "Powder Diffraction File".

Figure 2:
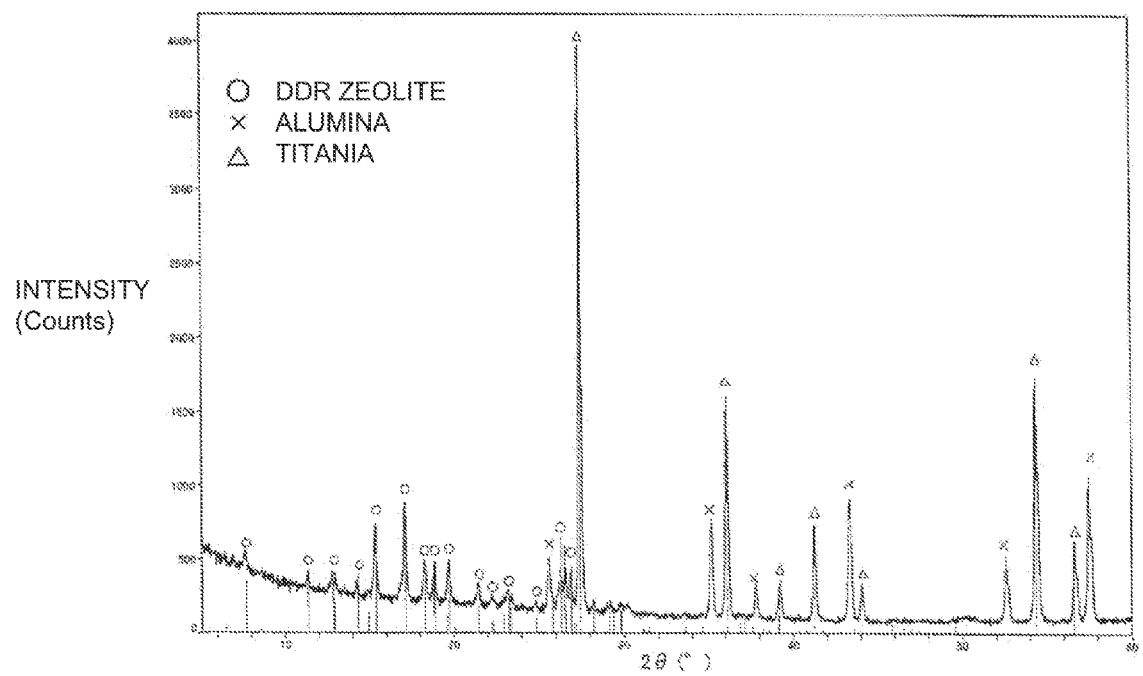
FIG. 2 is a diagram showing an X-ray diffraction pattern of an alumina support after a hydrothermal synthesis of Example 2.

An evaluation of a crystal phase of the alumina support after a hydrothermal synthesis of Example 2 was carried out by an X-ray diffraction. A diagram shown at FIG. 2 represents an X-ray analytical result measured by analyzing the alumina support after a hydrothermal synthesis of Example 2 with an X-ray diffractometer (RINT-TTR III commercially available from Rigaku Corporation). As a result, diffraction peaks of an alumina which is a component of the support (peaks represented by a cross (x) at FIG. 2), diffraction peaks of a titania (peaks represented by a triangle (Δ) at FIG. 2), and diffraction peaks of a DDR zeolite (peaks represented by a circle (○) at FIG. 2) were detected. Thus, it was confirmed that a crystal of a DDR zeolite was formed on the alumina support in the alumina support after a hydrothermal synthesis of Example 2.

Industrial Applicability

The present invention can be used as a method for producing a DDR zeolite which can be used for a catalyst, a catalyst support, an adsorbent, a gas separation membrane, a pervaporation membrane, and the like.

The invention claimed is:

1. A method for producing a DDR zeolite which comprises:
a raw material solution preparation step in which a raw material solution, that contains 1-adamantaneamine and a silica ($SiO_2$) and water at a molar ratio 1-adamantaneamine/$SiO_2$ of from 0.002 to 0.5 and a molar ratio water/$SiO_2$ of from 10 to 500 but does not contain ethylenediamine, is prepared; and
a crystal growth step in which a hydrothermal synthesis is carried out while having the raw material solution and a DDR zeolite powder in contact with each other, so that crystals of DDR zeolite are grown using the DDR zeolite powder as a seed crystal,
wherein during the raw material solution preparation step, a measure is taken to accelerate the dissolution of said 1-adamantaneamine in the raw material solution, and wherein the dissolution acceleration step comprises the step of irradiating an ultrasonic wave to the raw material solution.

2. The method for producing a DDR zeolite according to claim 1, wherein the crystal growth step comprises the step of bringing the raw material solution and the DDR zeolite powder in contact with each other by dispersing the DDR zeolite powder into the raw material solution.

3. The method for producing a DDR zeolite according to claim 1, wherein the crystal growth step comprises the step of bringing the raw material solution and the DDR zeolite powder in contact with each other by immersing, into the raw material solution, a support having the DDR zeolite powder adhered.

4. The method for producing a DDR zeolite according to claim 1, wherein the crystal growth step comprises the step of forming the DDR zeolite on a support by immersing the support into the raw material solution into which the DDR zeolite powder is dispersed.

5. The method for producing a DDR zeolite according to claim 1, wherein the raw material solution is heated to a temperature of 40° C. to 100° C.

* * * * *